Oct. 26, 1926.

R. BAADER

1,604,733

APPARATUS FOR BONING LARGE SIZED FISH

Filed Feb. 21, 1924     9 Sheets-Sheet 1

Oct. 26, 1926.
1,604,733
R. BAADER
APPARATUS FOR BONING LARGE SIZED FISH
Filed Feb. 21, 1924
9 Sheets-Sheet 6

Oct. 26, 1926.  
R. BAADER  
1,604,733  
APPARATUS FOR BONING LARGE SIZED FISH  
Filed Feb. 21, 1924. 9 Sheets-Sheet 7

Patented Oct. 26, 1926.

1,604,733

UNITED STATES PATENT OFFICE.

RUDOLPH BAADER, OF LUBECK, GERMANY.

APPARATUS FOR BONING LARGE-SIZED FISH.

Application filed February 21, 1924, Serial No. 694,428, and in Germany November 15, 1923.

This invention relates to a method and apparatus for decapitating, cutting and boning large-sized fish. The essential feature of the invention consists in rapidly and securely decapitating, cutting and boning partly or entirely large fish as haddock, cod, salmon and the like.

The new method consists in making, by means of an oscillable circular knife, an incision in the neck of the fish put on a spit, whereupon the head is severed by means of an axe-shaped knife oscillating on a curved path, the decapitated fish being then fed with the aid of a conveying band or the like into the cutting and boning apparatus in which the fish is held so that it is adapted to oscillate around a tail clamp to be advanced towards the knives which advance at the given moment into the cutting and boning positions, the oscillation of the boning knives being adjustable in such a manner that the back bone can be removed partly or entirely independently of the total length of the fish.

An embodiment of the apparatus according to the invention is shown by way of example, in the accompanying drawings, in which:—

Figs. 27 and 28 show in side elevation and plan view respectively the mechanism for transferring the decapitated fish from the decapitating machine to the opening and gutting machine.

Fig. 29 shows in end elevation a pair of conveying rollers in enlarged scale, and Fig. 30 shows in front elevation the guide for the tail fin at the end of the conveying arrangement.

Figures 3, 5:
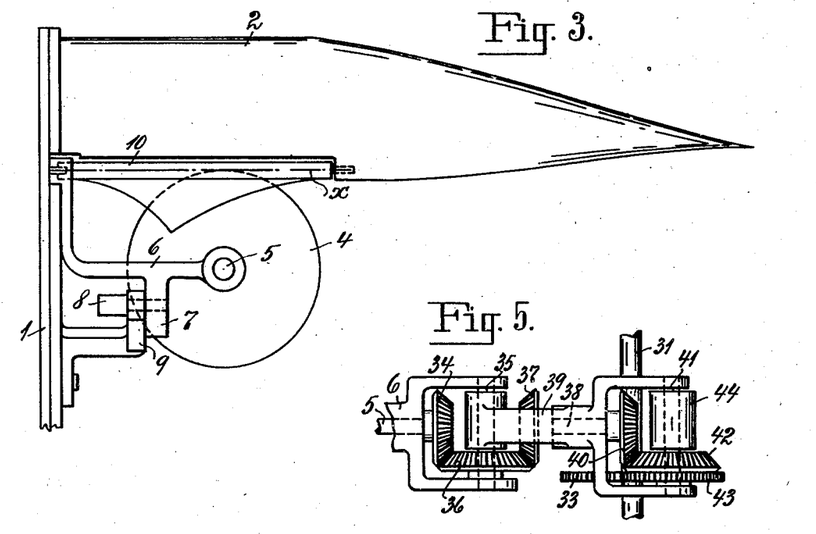
Fig. 3 shows in front elevation the decapitating knife with the spit.
Fig. 5 is a plan view of this driving mechanism.
Figure 4:
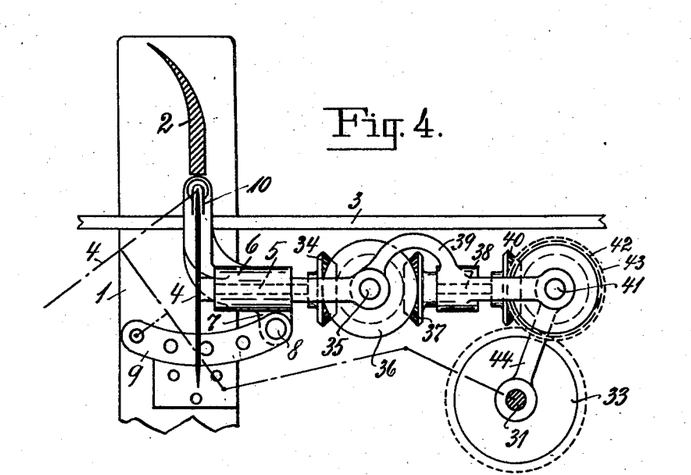
Fig. 4 shows in side elevation the driving mechanism for the decapitating knife.

A spit 2 known per se is arranged at right angles to the longitudinal axis of the machine frame 1, the point of which, having cutting edges, projects over a table 3 laterally arranged on the machine frame. A disk knife or circular knife 4 is arranged under the spit 2 and it is situated in the same vertical plane as this spit. The shaft 5 of knife 4 is revolubly mounted in an arm 6 oscillably mounted on the frame 1, said arm 6 having an extension 7 which is adjustably held on a perforated segment 9 by means of a bolt 8 (Figs. 3 and 4). The upper cutting edge of the knife 4 projects into a U-shaped rail 10 which is on the one hand pivotable in the spit 2 and on the other hand fixed to the oscillable arm 6, so that its movements are carried out positively with the movement of the arm 6 and of the knife 4.

On the shaft 11 (Figs. 1 and 2) journaled in the machine frame 1 an eccentric disk 12 is keyed which is adjusted to rotate in a ring 13 of the arm 14. An axe-shaped knife 16, the sharp front edge of which is preferably indented is oscillably mounted on a pivot pin 15 of arm 14.

Figure 1:
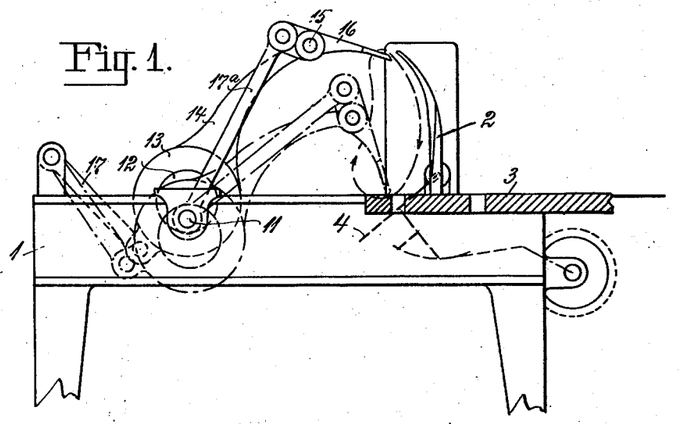
Fig. 1 shows in side elevation the decapitating device, the driving mechanism being removed.
Figures 2, 6:
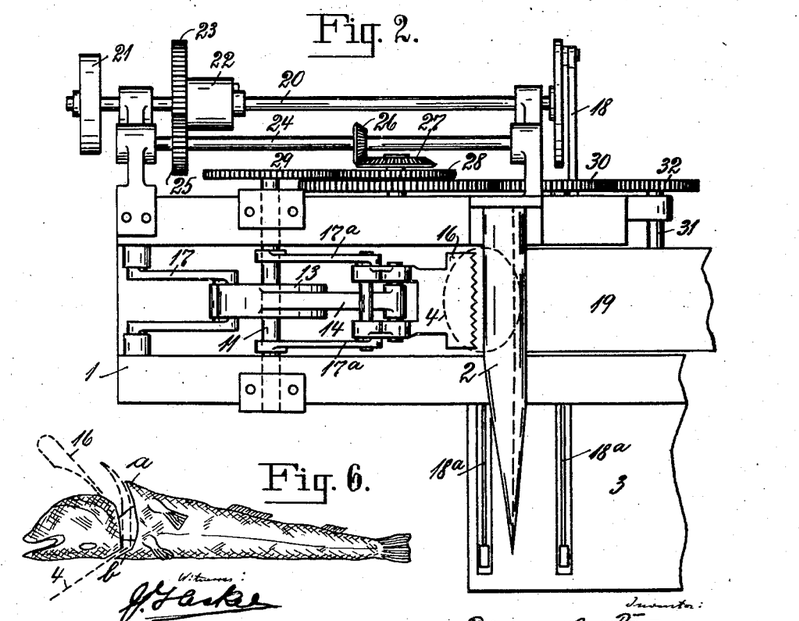
Fig. 2 is a plan view of the decapitating device.
Fig. 6 shows a fish in the decapitating position.

The movements of the arm 14 are limited by a rod 17. The rear part of the knife 16 extending beyond the pivot pin 15 is pivotally connected with a pair of levers 17$^a$ loosely arranged on the shaft 11. The knife 16 is thus guided along a curved path which in the beginning extends parallel to the concavity of the spit 2 and later on horizontally to this concavity (Fig. 1).

A lever 18 (Fig. 2) is mounted on the machine frame 1 and its two arms 18$^a$ having abutments, oscillate at either side of spit 2 through slits in the table 3. A conveyor band 19, an incline or a similar device, is arranged behind the spit 2 and it consists of a number of roller pairs 19$^a$ adjustably mounted on their axles and permanently circulating with the aid of a chain 19$^b$. This conveyor chain 19$^b$ gets close to the disks 46, 47. At the end of the conveyor 19, at a slight distance from the disks 46, 47, a guide fork 19$^c$ for the tail fin of the fish (Fig. 30) is arranged which has a funnel shaped inlet opening.

The decapitating mechanism is driven from the belt pulley 21 on shaft 20 and the operation begins as soon as the clutch 22 has been coupled with the toothed wheel 23 by hand or by foot. The gear wheel 23 meshes with a gear wheel 25 keyed on the shaft 24 by the rotation of which gear wheel the shaft 24 and with the same the bevel wheel 26 keyed on this shaft are rotated.

Through the intermediary of a bevel wheel 27 and of the gear wheel 28 a gear wheel 29 keyed on the shaft 11 of the eccentric is driven whereby the knife 16 is operated. Through the intermediary of a gear wheel 30 the toothed wheel 32 on shaft 31 is revolved and the gear wheel 33 keyed on the shaft 31 drives the knife 4.

The following mechanism is arranged in order to permit of the knife 4 being oscillated around an axis imagined through the upper cutting edge of the knife, the knife being uniformly rotated.

On the knife shaft 5 journaled in the arm 6 a bevel wheel 34 is keyed which meshes with the bevel wheel 36 loosely mounted on shaft 35. This loose bevel wheel 36 meshes with the bevel wheel 37 which is keyed on a shaft 38 journaled in an arm 39 adapted to be oscillated around the shaft 35 (Fig. 5). On the shaft 38 a bevel wheel 40 is keyed which meshes with a bevel wheel 42 loosely mounted on a shaft 41. With this loose bevel wheel 42 the spur wheel 43 is rigidly connected which is in gear with the spur wheel 33.

On the shafts 31 and 41 the connecting arm 44 is loosely mounted so that the spur wheel 43 may freely oscillate around the stationary toothed wheel 33.

Figure 7:
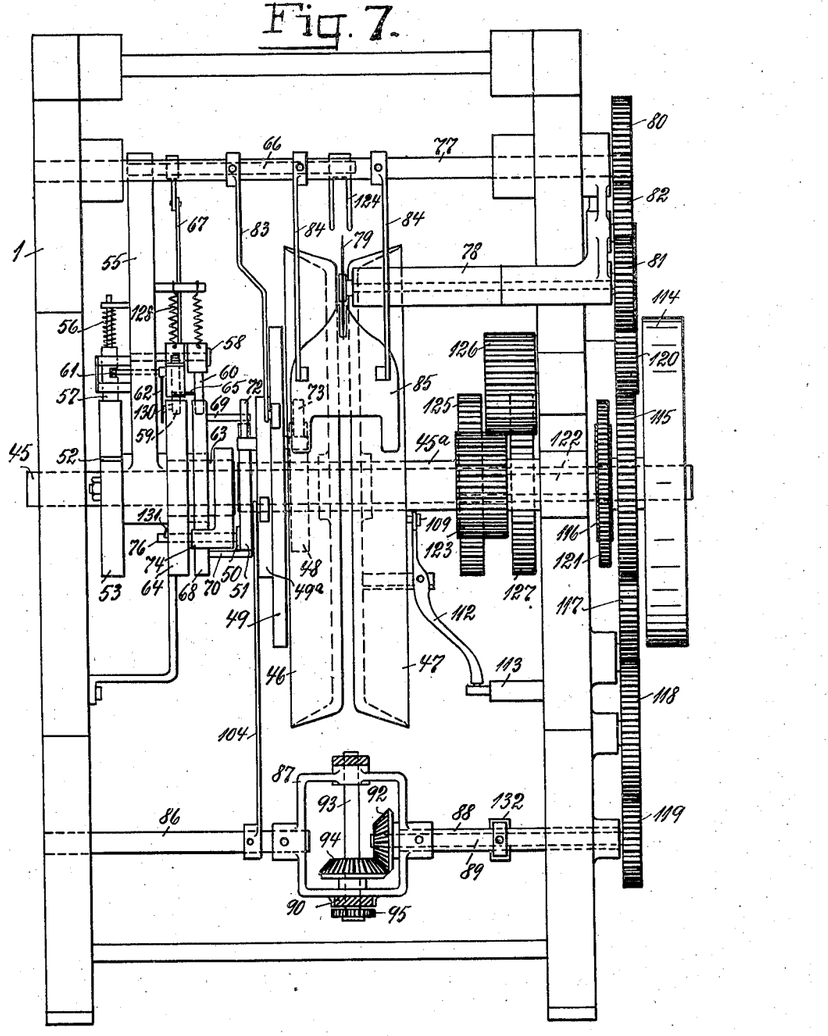
Fig. 7 shows the cutting and boning device seen from the rear.
Figure 8:
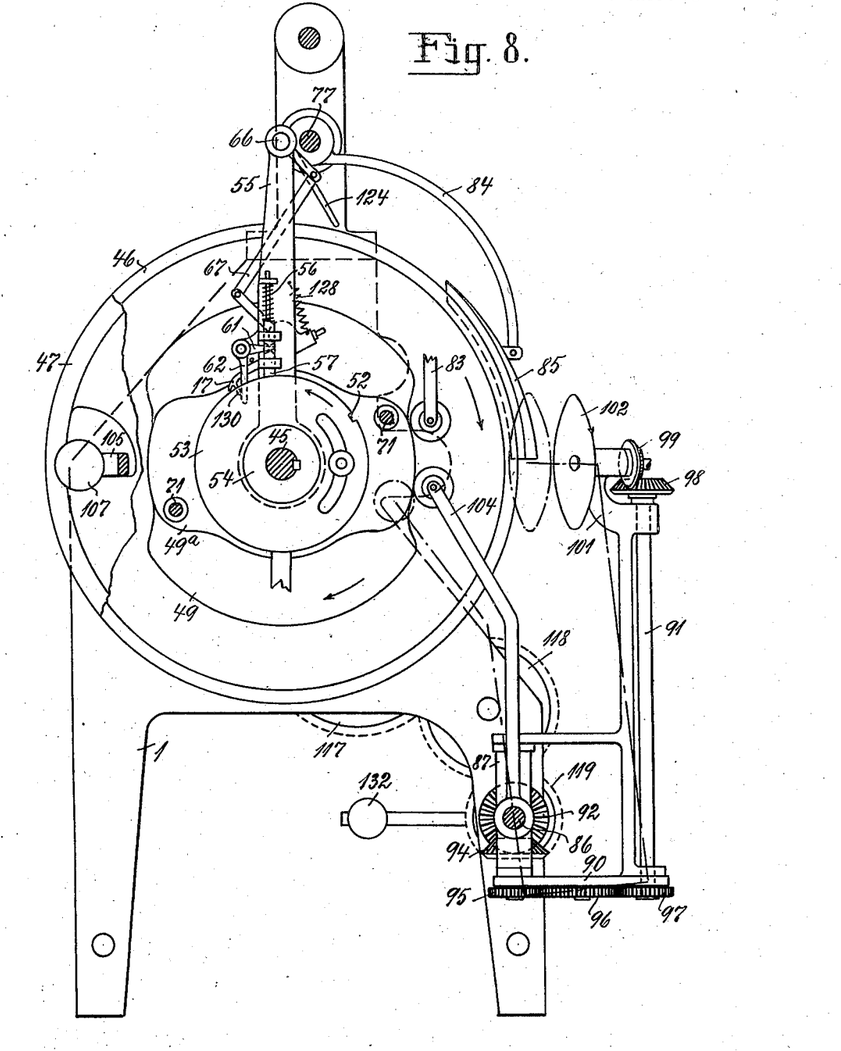
Figs. 8 and 9 show each a side elevation in section of the cutting and boning device.
Figure 10:
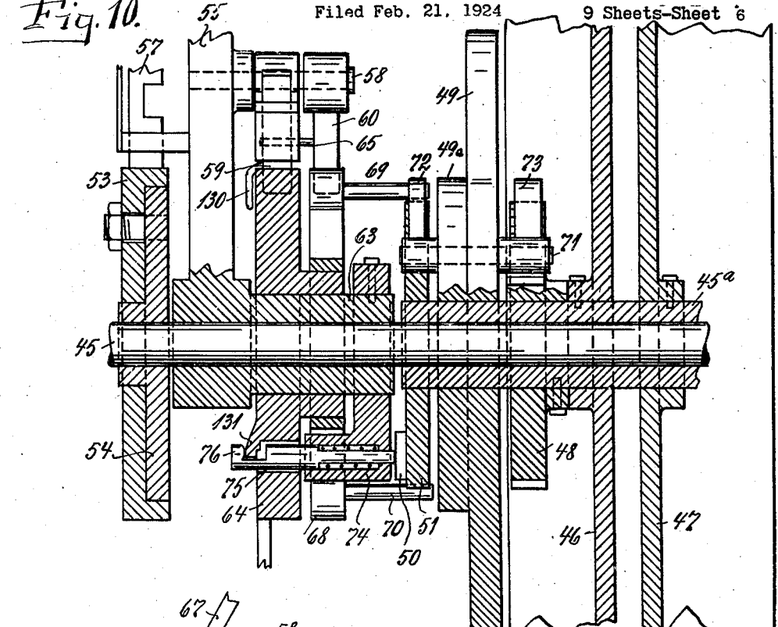
Fig. 10 is a vertical cross section through the driving elements on a larger scale.

On the shaft 45 journaled in the frame 1 of the cutting and removing apparatus two vertical rotating disks 46 and 47, rigidly connected with the bush 45$^a$ are mounted spaced at convenient distance and having each a flat inclined rim the rims of the two disks forming together an obtuse angle. At the side of disk 46 the driving elements are arranged. The toothed wheel 48 is keyed on bush 45$^a$ and the cam disk 49, at the side of toothed wheel 48, is loosely mounted on said bush. At the side of the cam disk 49 a disk 51 having an extension 50 is keyed on bush 45$^a$. On the shaft 45 a twin-disk 53, 54 is further mounted, the disk 54 being keyed on the shaft, and the disk 53 which in its circumference has a groove 52 being movably connected with disk 54 so that it may be locked in its position. At the side of the twin-disk 53, 54 a lever 55 is loosely mounted on shaft 45. On this lever 55 a bolt 57, controlled by a spring 56, and two spring-controlled pawls 59 and 60 are mounted, and further a two-armed lever the one arm 61 of which engages with bolt 57, the other arm 62 being situated directly at the side of a disk 64 which is loosely mounted on the hub 63 of the lever 55, rigidly connected with the machine frame 1 and having on part of its circumference upwardly directed teeth. The pawl 59 is resilient and on the pawl 60 a pin 65 is arranged which is in contact with the pawl 59 so that at each raising of the pawl 59 the pawl 60 will be disengaged from the teeth of the disk 64. The releasing of the pawls 59, 60 is effected through the intermediary of a lever system 67 fixed on the one hand to the casing of pawl 59 and on the other hand on an arm 66 which stands parallel to the driving shaft 2 and is fixed to the upper end of the lever 55. A toothed segment 68 for pawl 59 is loosely mounted on the hub of the toothed disk 64, and two pins 69 and 70 are fixed diametrically opposite one another in said toothed segment, said pins extending over the disk 51 and engaging each with a lever 72 fixed on a bolt 71 which is rotatably mounted in the cam disk 49 (Figs. 7, 8 and 10). On each of these bolts 71 a spring-controlled pawl 73 is fixed on the other side of the cam disk 49, said pawls engaging with the teeth of toothed wheel 48. On the extended hub 63 of the lever 55 a hinge 74 is fixed in which a spring-controlled bolt 76 is located which projects through a slot 75 of disk 64, said slot having at its lower end a wedge-shaped contact surface 131 for said bolt, and said bolt engages further with the extension 50 of disk 51.

An arm 78 is further keyed on the upper shaft 77 (Fig. 7) in which between the disks 46, 47 a circular knife 79 is rotatably mounted. This knife 79 is driven from the toothed wheel 80 keyed on shaft 77 through the intermediary of the toothed wheel 82 and toothed wheel 81 keyed on the knife shaft. A lever arm 83 is further keyed on shaft 77 and engages with the cam disk 49. Two arms 84 are further keyed on shaft 77 which carry a curved body 85 which has a slit for the knife 79 and stands above the rims of the disks 46, 47.

A frame 87 is fixed on the one hand on a shaft 86 and on the other hand on a bush 88 on shaft 89, said frame having an arm 90 in which a shaft 91 is journaled which is vertical or almost vertical. A bevel wheel 92 is keyed on the free end of the shaft 89 and meshes with the bevel wheel 94 keyed on a shaft 93 journaled in said frame 87. On the outer end of this shaft 93 a gear wheel 95 is keyed which, through the intermediary of the gear wheel 96, gears with a gear wheel 97 on shaft 91. On the upper end of the vertical shaft 91 (Fig. 8) a bevel wheel 98 is keyed which meshes with two bevel wheels 99, 100 which are connected with shafts of the circular knives 102 and 103 which are arranged at an angle the one with regard to the other vertically and rotate perpendicularly to the circumference of the disks 46, 47, the shafts of said circular knives being journaled in the bracket 101. The knife 103 projects slightly over the knife 102 so that it penetrates, at the cutting, more deeply into the body of the fish than the knife 103. On the shaft 86 a lever 104 is further fixed the upper end of which engages with the groove 49ª of the cam disk 49.

Figure 13:
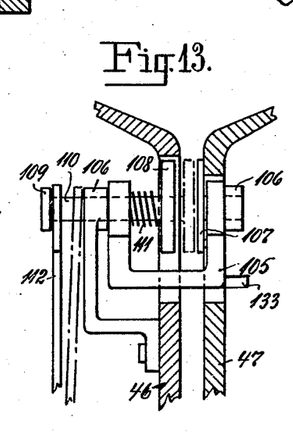
Figure 13 shows, enlarged, the arrangement for holding the fish during the operation.
Figures 14, 15:
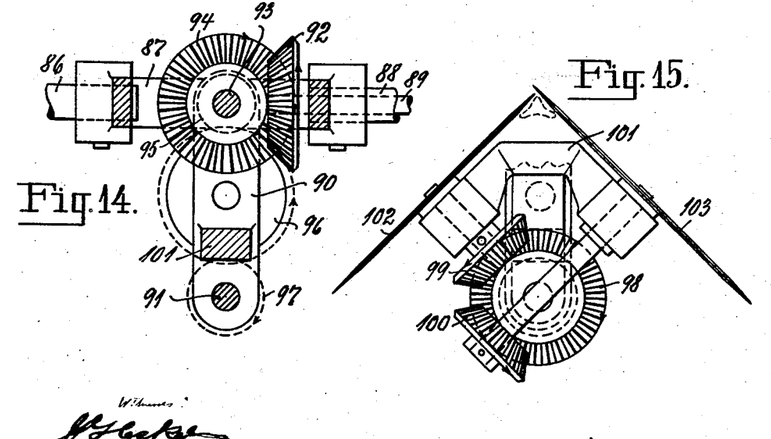
Fig. 14 shows, enlarged, the driving gear for the boning knives in plan view.
Fig. 15 shows, enlarged, the boning knives in plan view.

On the disks 46 and 47 a clamping mechanism for the fish's tail is arranged designed to hold the fish during the cutting and boning. This clamping mechanism consists of a bow-shaped piece 105 with which a clamping jaw 107 (Fig. 13) is connected in such a manner that its free flat surface is situated approximately at the middle between the disks 46 and 47. The second clamping jaw 108 is mounted on a horizontal bolt 110 which at its outer end has a collar 109 and is controlled by spring 111. An oscillating lever 112 mounted on disk 47 embraces the bolt 110 between the collar 109 and the journal 106, this lever 112 engaging at the other end with a curve 113 in the machine frame.

A belt pulley 114 loosely mounted on shaft 45 serves for driving this clamping mechanism. Spur wheels 115 and 116 are rigidly connected with the belt pulley 114 (Fig. 7). The spur wheel 115 serves for transmitting the revolving movements of the belt pulley 114 through the intermediary of the gear wheels 117, 118 and 119 to the lower shaft 89 and at the same time through the intermediary of the gear wheel 120 upon the toothed wheel 80 keyed on the shaft 77.

The gear wheel 116 transmits the revolving movements of the belt pulley 114 upon the spur wheel 121 and consequently upon the spur wheel 123 keyed on the same shaft 122 as the spur wheel 121. The spur wheel 123 gears with the spur wheel 125 keyed on the bush 45ª of the disks 46, 47 and further with a spur wheel 126 which gears with a spur wheel 127 keyed on shaft 45. Owing to this arrangement the shaft 45 and the elements keyed on the same are revolved in opposite direction as the disks 46, 47 and the elements mounted on bush 45ª. This mechanism operates as follows:—

The large-sized fish to be decapitated, cut and boned, for instance a haddock, a cod, salmon, or the like, is placed with the back on the table 3 so that it is advanced before the point of the spit 2, this point penetrating into the gills of the fish directly between the cartilaginous bordering of the body flesh and the gill-cover. As soon as the fish has been brought into this position the drive is thrown in, whereupon the lever 18 oscillates and pushes, by means of the arms 18ª, the fish along the table upon the spit 2. The gut $a$ of the fish (Fig. 6) is cut by the sharp edge of the spit, the fish coming then in contact with the correspondingly adjusted knife 4. This knife 4 is in vertical position (Fig. 4 shown in full lines) when it cuts at right angles into the neck flesh of the fish, while it adopts an inclined position (shown in Fig. 4 in dash and dot line) when the part $b$ of the flesh under the head of the fish (Fig. 6) has to remain on the body. The knife cuts also entirely or partly the back bone of the fish so that the body of the fish is now directly in front of the knife 16 on the conveyor band 19, the head projecting from this conveyor band. The sharp indented front edge of the knife 16 penetrates into the fish head and severs the same from the body when the knife moves along a curved path. As the head is at first pushed downward by the knife 16 and then pulled off from the body, the back bone of the fish, which has not been entirely cut, is easily broken off while the guts' sack remains fixed to the head so that when the head is now severed from the body, the guts, together with the covering of the same, are pulled out of the abdominal cavity.

During the decapitation the fish lies on its back upon the conveyor band 19. As soon as the head has been separated from the body of the fish the head drops into a vessel placed underneath and the body of the fish is conveyed towards the disks 46, 47. The tail fin of the fish passes through the slot of the fork shaped guide 19ᶜ until the tail root strikes against this guide. In this position the tail fin is between the disks 46, 47 in the direction of the tail clamp 107, 108. As soon as the tail clamp 107, 108 is brought by the rotating disks to either side of the tail fin, the lever 112 drops off the cam 113 whereby the clamping jaw 108 is strongly pressed against the clamping jaw 107 through the action of spring 111 and the tail fin is securely gripped between these clamping jaws. This cutting and boning device may be used for cutting fresh fish decapitated in the preceding working phase, or already dried and salted large-sized fish.

Figure 9:
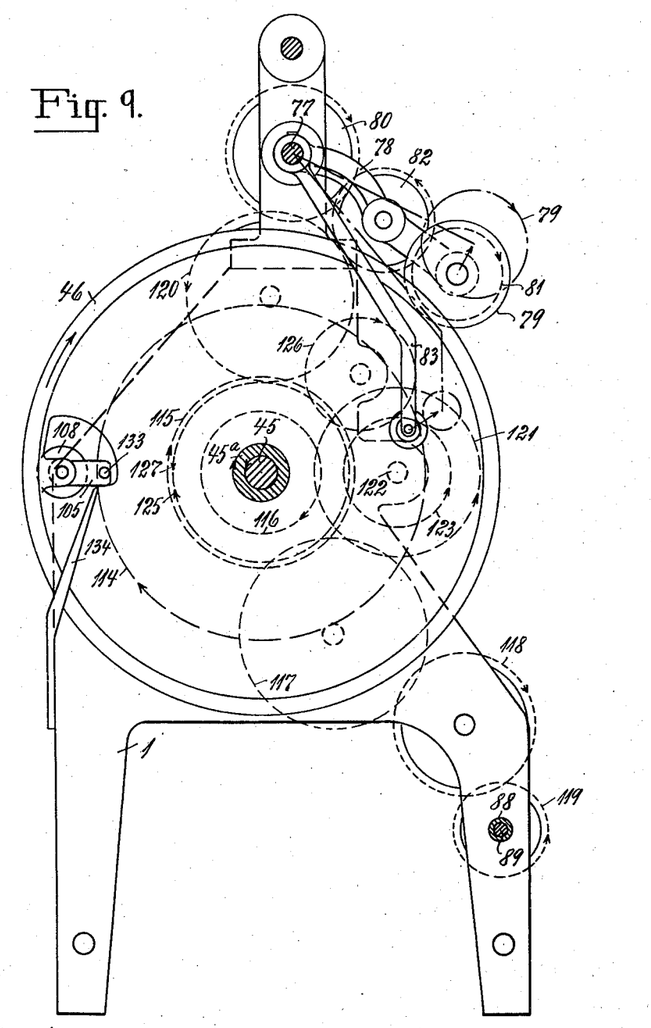
Figures 11, 16:
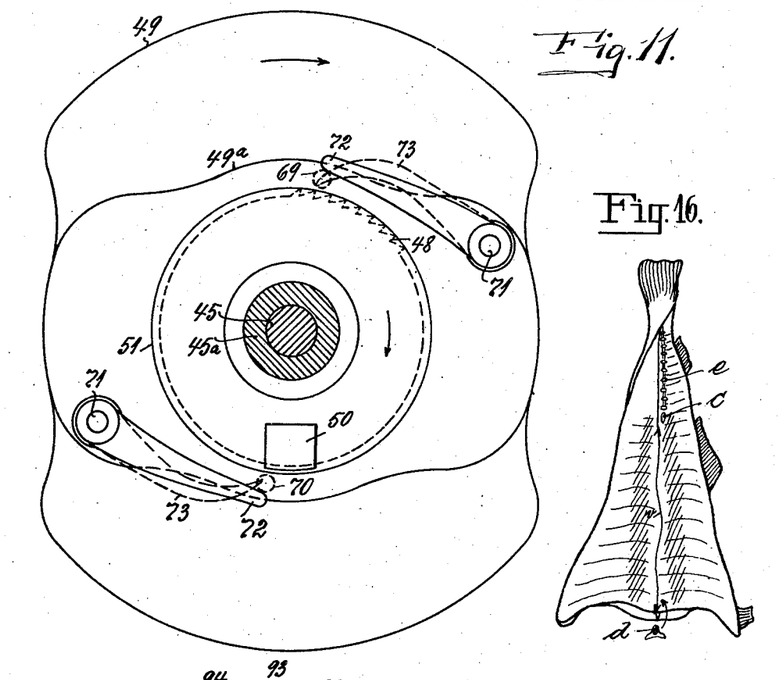
Fig. 11 shows in end view and on a much larger scale the cam disk for the movement of the cutting and boning knives.
Fig. 16 shows a fish cut open and partly boned.
Figure 12:
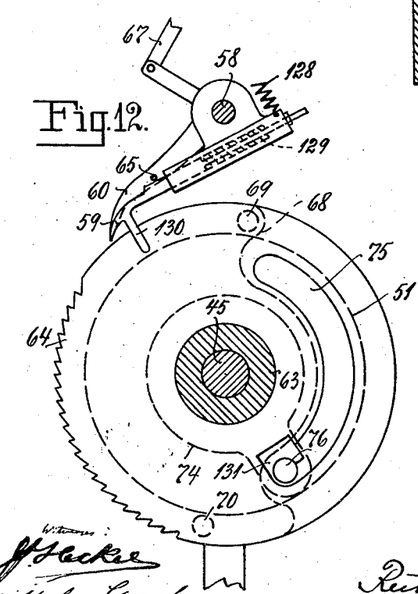
Fig. 12 shows, enlarged, the means for stopping the lever movement.
Figure 17:
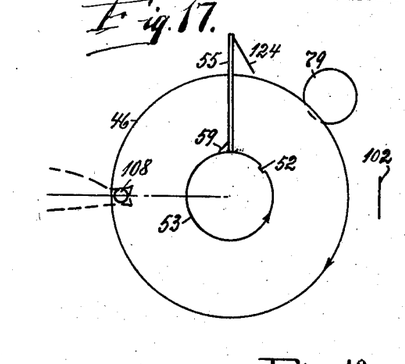
Figs. 17—22 illustrate diagrammatically a working phase for the removing of about two thirds of the back bone.
Figure 18:
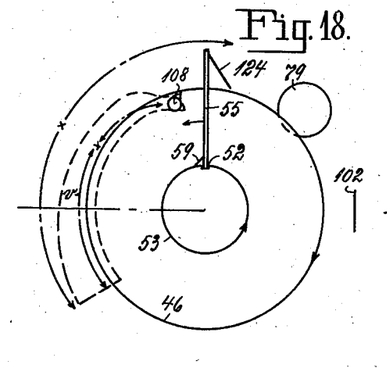
Figure 19:
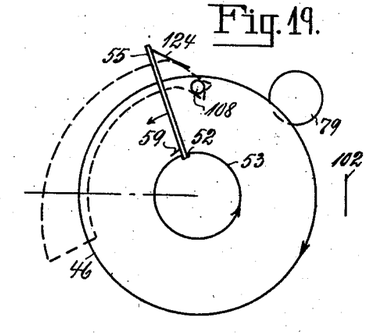
Figure 20:
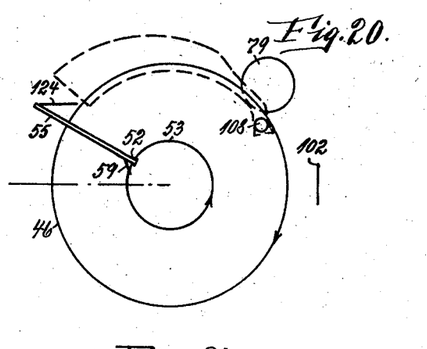
Figure 21:
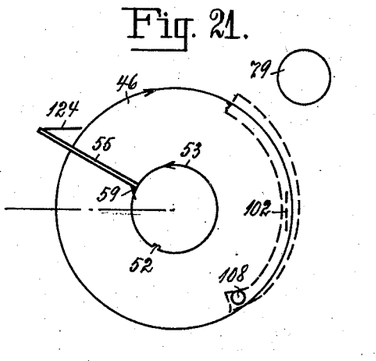

As the disks 46, 47 continue to rotate the fish is drawn along so that the back of the fish drops into the interval between the disks 46, 47, the bow-shaped holder 105 of the clamping jaws 107, 108 oscillating through 45° as otherwise the back bone would break at the tail root. If, for instance, the prismatic part $d$ of the back bone (Fig. 16) has to be removed from the blood vessel, which is situated on the back bone directly above the anus, up to the point at which the head has been severed (Figs. 6 and 16 direction of arrow $v$) the disk 53 is correspondingly adjusted on the disk 54, e. g. the groove 52 is adjusted so that it extends from a point imagined in the direction of the point of insertion of the fish between the disks over about one third of the circumference of the disks (Fig. 17). The blood vessel is situated at the end of the first third of the entire length of the fish. The twin disk 53, 54 rotates continuously in a direction opposite to that in which the disks 46, 47 rotate. As soon as the groove 52 has arrived below the bolt 57, this bolt engages with the groove so that the lever 55 is coupled with the twin disk 53, 54 and consequently revolves in a direction opposite to that of the disks 46, 47. In this position the point $c$ at which the bone has to be cut may be determined from a fixed point and this cutting point is situated in the point of intersection of an arc of circle traced from the end point of the lever 124 sliding along the fish to the point at which the head of the fish has been cut and of a line drawn through the centre of this arc of circle and the driving shaft 45 (Figs. 18, 23, 24, 25, 26). When the movement of the lever 55 begins the pawl 59 slides at first along the smooth part of the stationary toothed disk 64. The length of this travel corresponds to the length of the fish's tail (Fig. 12). The fish has in the mean time been advanced so far that its flesh (the tail root) strikes against the fork-shaped lever 124 rigidly connected with the arm 66 of lever 55 (Fig. 19). This fork-shaped lever 124 is thus raised in making oscillate the arm 66 whereby, through the intermediary of the lever 67 which is also rigidly connected with the arm 66 the pawl 59 and at the same time the pawl 60 are lifted (Fig. 19). The cam disk 49 is stopped, the knife is in the cutting position (Fig. 9 position shown in full lines) and the knives 102, 103 stand at some distance from the circumference of the disks 46, 47 (Fig. 8 position shown in full lines). At the further revolution of the disks 46, 47 the tail of the fish strikes against the knife 79 which cuts the fish open from the tail fin to the blood vessel at the side of the oval central bone $e$ (Fig. 16). Shortly before this cutting action of the knife 79 is finished the end of the fish clears the lever 124 which drops off the fish body (Fig. 20) so that the pawl 59 drops under the action of the spring 128 into a gap between two teeth of the toothed disk 64, the pawl 60 engaging at the same time with a gap between two teeth of the segment 68. As there exists still, through the bolt 57, a connection between the twin-disk 53, 54 and the lever 55 this lever continues to move along for a short distance when the pawl bears against a tooth of the disk 64, the pawl 59 being thus pushed into its casing against the action of the spring 129. A stop 130 on pawl 59 strikes against the arm 62 of the two-armed lever 61, 62, said arm 62 being thus oscillated so that the arm 61 lifts the bolt 57 out of the groove 52 of the twin disk 53, 54. The connection between the twin-disk 53, 54 and the lever 55 is thus interrupted. The twin disk 53, 54 continues to move while the lever 55 is stopped (Fig. 21). While the pawl 59 is pushed into its casing the rigid pawl 60 operates the segment 68. Owing to the short movement of the segment 68 the levers 72 drop off the studs 69, 70 of the segment 68 so that the pawl 73 drops into the teeth of the toothed wheel 48 keyed on the bush 45$^a$. The cam disk 49 is thus coupled with the bush 45$^a$ and rotated in the same direction as the disks 46, 47.

Figure 22:
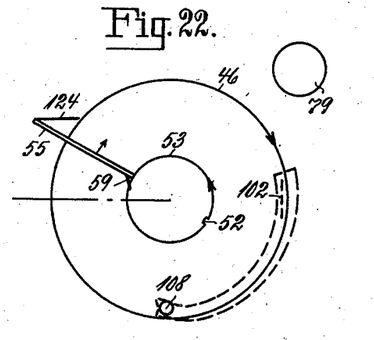
Figure 23:
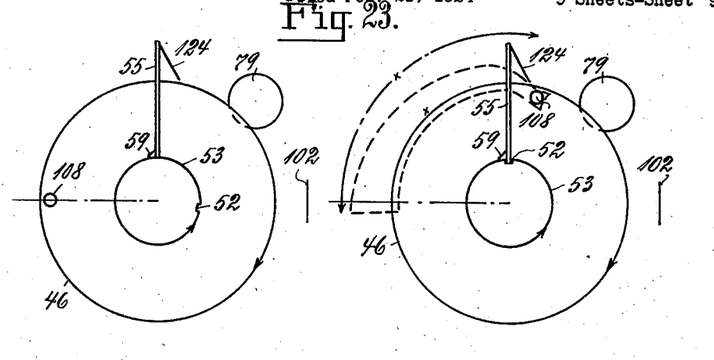
Fig. 23 shows the cam disk adjusted for the removing of half of the bone.
Figure 24:
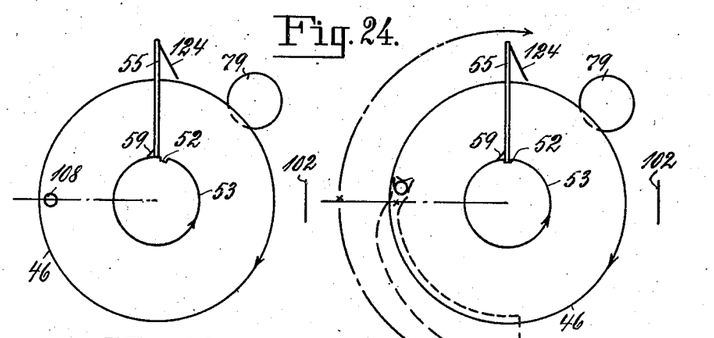
Fig. 24 shows the cam disk adjusted for the removing of the entire bone.
Figure 25:
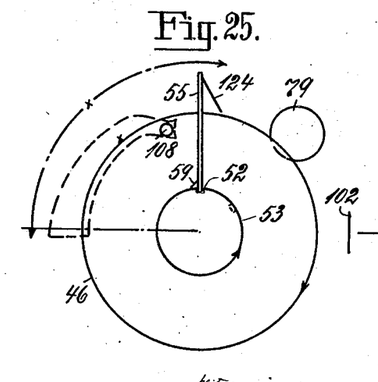
Fig. 25 shows the cam disk adjusted for removing of two thirds of the bone of a short fish.
Figure 26:
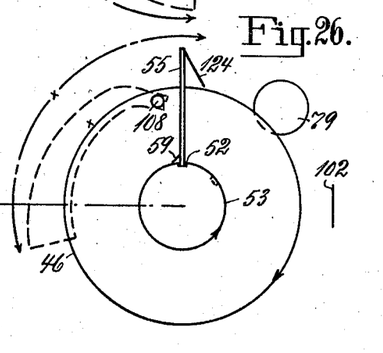
Fig. 26 shows the cam disk adjusted for the removing of two thirds of the bone of a long fish.

When the coupled lever 55 is moving in opposite direction to the disks 46, 47 the block 74 fixed on the hub 63 of lever 55 is moved also, the bolt 76 is moved in the slit 75 of disk 64 and slides off the wedge-shaped surface 131. In the meantime the extension 50 has cleared, owing to the movement of the disk 51 keyed on bush 45$^a$, the bolt 76 so that this bolt is free to move towards the disk 51. At the further rotation of the disk 51 the projection 50 strikes against the bolt 76 and draws along this bolt and with it the block 74 and the lever 55 connected with the same (Fig. 22) until the bolt has come out of engagement with the projection owing to the action of the wedge-shaped surface 131. All the elements have now returned to the initial position.

As soon as the cam disk 49 has been coupled, shortly before the blood vessel of the fish has passed the knife 79, the lever 83 is made to oscillate by the curved groove 49 whereby the knife 79 is moved away from the circumference of the disk (Fig. 21). The lever 104 comes now in engagement with the curved groove 49$^a$ so that the knives 102, 103 are moved by the action of the counterweight 132 against the circumference of the disks 46, 47 (Fig. 8) at the instant when the determined cutting point of the back bone stands in the direction of the knife edges. Owing to the movement of the knives 102, 103 in opposite directionwards the circumference of the disk the bone is cut at c, as the movement of the fish is interrupted (Fig. 16), whereupon the knives penetrate into the flesh at the side of the prismatic part c of the bone and make the same free (Fig. 16). The cam disk 49 executes for each working period, e. g. at one complete revolution of the disks, only half a revolution. The block 74 strikes at its return movement, controlled by the disk 51, at the end of this movement against the toothed segment 68 and brings this toothed segment and consequently the studs 69, 70 to the initial position. The lever 71 comes now in contact with the studs 69, 70 whereby the pawls 73 are lifted and the cam disk 49 is uncoupled.

Shortly before the end of the working period the lever 112 runs up the curve 113 so that the tail clamp 107, 108 is opened and the fish drops off the circumference of the disk. The bow-shaped support 105 of the clamping jaws 107, 108 strikes with its abutment 133 against an arm 134 fixed on the machine frame, said arm returning the bow-shaped support 105 into the initial position.

The body 85, the form of which corresponds with the circumference of the disk, opens the fish as soon as it has been cut by the knife 79 and maintains it in the open position on the circumference of the disks 46, 47 until the bone has been cut out.

The knives 79, 102, 103 have preferably an indented cutting edge in order to produce a tearing effect besides the cutting effect.

I claim:—

1. Apparatus for boning large-sized fish comprising in combination two rotating vertical disks for holding the decapitated fish, a circular knife adapted to oscillate towards the circumferences of said disks designed to cut the fish open, two circular knives adapted to oscillate towards said disks standing at an angle with regard to one another and designed for cutting out the back bone, and levers designed to determinate in relation to the total length of the fish the point at which the back bone has to be cut.

2. Apparatus of the type described comprising in combination two vertically arranged rotatable disks for holding the fish, a tail clamp in said disks, a bow-shaped support rotatably mounted in said disks and carrying one of the clamping jaws of said tail clamp, a spring-controlled bolt on which the other clamping jaw is pivotally mounted and a cam-controlled lever for operating said second mentioned clamping jaw.

3. Apparatus of the type described comprising in combination two disks rotating in a vertical plane serving to support the fish, a tail clamp for holding the tail of the fish, a disk knife oscillably mounted so that it can be oscillated towards the circumference of said disks, and a cam disk for controlling said disk knife.

4. Apparatus of the type described comprising in combination two disks rotating in a vertical plane, a tail clamp for holding the fish on the circumferences of said disks, a driving shaft on which said rotating disks are mounted and a grooved disk adjustable per se keyed on said driving shaft.

5. Apparatus of the type described comprising in combination two disks rotating in a vertical plane, a tail clamp for holding the fish on the circumferences of said disks, a driving shaft and a grooved disk adjustable per se keyed on said driving shaft, a bush laterally mounted on said driving shaft and carrying said supporting disks and means for rotating said bush in a direction opposite to the direction of rotation of said driving shaft.

6. Apparatus of the type described comprising in combination two disks rotating in a vertical plane, a tail clamp for holding the fish on the circumferences of said disks, a driving shaft on which said rotating disks are mounted and a grooved disk adjustable per se keyed on said driving shaft, a lever adapted to be intermittently coupled by said grooved disk with said driving shaft and a spring-controlled bolt connected with said lever and designed to couple said lever with said grooved disk.

7. Apparatus of the type described comprising in combination two disks rotating in a vertical plane, a tail clamp for holding the fish on the circumferences of said disks, a driving shaft on which said rotating disks are mounted and a grooved disk adjustable per se keyed on said driving shaft, a lever adapted to be intermittently coupled by said grooved disk with said driving shaft and a spring-controlled bolt connected with said lever and designed to couple said lever with said grooved disk, and a spring-controlled pawl designed to release the coupling between said lever and said grooved disk.

8. Apparatus of the type described comprising in combination two disks rotating in a vertical plane, a tail clamp for holding the fish on the circumferences of said disks, a driving shaft on which said rotating disks are mounted, a grooved disk adjustable per se keyed on said driving shaft, a lever adapted to be intermittently coupled by said grooved disk with said driving shaft, a spring-controlled bolt connected with said lever and designed to couple said lever with said grooved disk, a spring-controlled pawl designed to release the coupling between said lever and said grooved disk, and a toothed disk rigidly connected with the machine frame and serving as ratchet disk for said spring-controlled pawl.

9. Apparatus of the type described comprising in combination two disks rotating in a vertical plane, a tail clamp for holding the fish on the circumferences of said disks, a driving shaft on which said rotating disks are mounted, a grooved disk adjustable per se keyed on said driving shaft, a lever adapted to be intermittently coupled by said grooved disk with said driving shaft, a spring-controlled bolt connected with said lever and designed to couple said lever with said grooved disk, a spring-controlled pawl designed to release the coupling between said lever and said grooved disk, a toothed disk rigidly connected with the machine frame and serving as ratchet disk for said spring-controlled pawl, and a toothed segment mounted on the hub of said toothed disk.

10. Apparatus of the type described comprising in combination two disks rotating in a vertical plane, a tail clamp for holding the fish on the circumferences of said disks, a driving shaft on which said rotating disks are mounted, a grooved disk adjustable per se keyed on said driving shaft, a lever adapted to be intermittently coupled by said grooved disk with said driving shaft, a spring-controlled bolt connected with said lever and designed to couple said lever with said grooved disk, a spring-controlled pawl designed to release the coupling between said lever and said grooved disk, a toothed disk rigidly connected with the machine frame and serving as ratchet disk for said spring-controlled pawl, a toothed segment mounted on the hub of said toothed disk, and a second spring-controlled pawl which is positively engaging at the same time as the first mentioned pawl with the teeth of the toothed segment.

11. Apparatus of the type described comprising in combination two disks rotating in a vertical plane, a tail clamp for holding the fish on the circumferences of said disks, a driving shaft on which said rotating disks are mounted, a grooved disk adjustable per se keyed on said driving shaft, a lever adapted to be intermittently coupled by said grooved disk with said driving shaft, a spring-controlled bolt connected with said lever and designed to couple said lever with said grooved disk, a spring-controlled pawl designed to release the coupling between said lever and said grooved disk, a toothed disk rigidly connected with the machine frame and serving as ratchet disk for said spring-controlled pawl, a toothed segment mounted on the hub of said toothed disk, a second spring-controlled pawl which is positively engaging at the same time as the first mentioned pawl with the teeth of the toothed segment, a block keyed on the hub of said lever, and a spring-controlled bolt mounted in said block and engaging with a wedge-shaped surface of said toothed disk.

12. Apparatus of the type described comprising in combination two disks rotating in a vertical plane, a tail clamp for holding the fish on the circumference of said disks, a driving shaft on which said rotating disks are mounted, a grooved disk adjustable per se keyed on said driving shaft, a lever adapted to be intermittently coupled by said grooved disk with said driving shaft, a spring-controlled bolt connected with said lever and designed to couple said lever with said grooved disk, a spring-controlled pawl designed to release the coupling between said lever and said grooved disk, a toothed disk rigidly connected with the machine frame and serving as ratchet disk for said spring-controlled pawl, a toothed segment mounted on the hub of said toothed disk, a second spring-controlled pawl which is positively engaging at the same time as the first mentioned pawl with the teeth of the toothed segment, a block keyed on the hub of said lever, a spring-controlled bolt mounted in said block and engaging with a wedge-shaped surface of said toothed disk, and a disk keyed on said bush, an abutment of said disk engaging with said bolt of the block.

13. Apparatus of the type described comprising in combination two disks rotating in a vertical plane, a tail clamp for holding the fish on the circumferences of said disk, a driving shaft on which said rotating disks are mounted, a grooved disk adjustable per se keyed on said driving shaft, a lever adapted to be intermittently coupled by said grooved disk with said driving shaft, a spring-controlled bolt connected with said lever and designed to couple said lever with said grooved disk, a spring-controlled pawl designed to release the coupling between said lever and said grooved disk, a toothed disk rigidly connected with the machine frame and serving as ratchet disk for said spring-controlled pawl, a toothed segment mounted on the hub of said toothed disk, a second spring-controlled pawl which is positively engaging at the same time as the first mentioned pawl with the teeth of the toothed segment, a block keyed on the hub of said lever, a spring-controlled bolt mounted in said block and engaging with a wedge-shaped surface of said toothed disk, a disk keyed on said bush, an abutment of said disk engaging with said bolt of the block, a disk with curves, a double pawl mounted on said disk, bolts in said toothed segment for holding said double pawl and a toothed wheel arranged at the side of the disk with which said double pawl is adapted to engage.

14. Apparatus of the type described comprising in combination two disks rotating in a vertical plane, a tail clamp for holding the fish on the circumferences of said disk, a driving shaft, a grooved disk keyed on said driving shaft, a lever temporarily coupled by said grooved disk with said driving shaft, a fork-shaped lever pivotally mounted in said first mentioned lever and designed to slide along the belly-edge of the fish.

15. Apparatus of the type described comprising in combination two disks rotating in a vertical plane, a tail clamp for holding the fish on the circumferences of said disks, a driving shaft, a grooved disk keyed on said driving shaft, a lever temporarily coupled by said grooved disk with said driving shaft, a fork-shaped lever pivotally mounted in said first mentioned lever and designed to slide along the belly-edge of said fish, a toothed disk, a spring-controlled pawl of said toothed disk and a lever system connected with the arm of said lever and with said spring-controlled pawl.

16. An apparatus of the type described comprising in combination two disks for holding the decapitated fish rotating in a vertical plane, a disk-knife for cutting the fish open oscillating towards the circumference of said disks, two disk knives standing at an angle to one another oscillating towards the holding disks and designed for cutting out the back bone of the fish, levers designed to determine the point at which the back bone has to be cut off upon a determined point with reward to the total length of the fish and a curved body concentric with the circumference of said holding disks and designed for holding open the fish.

17. In an apparatus of the type described comprising in combination two holding disks, a tail clamp in said holding disks, a bow-shaped support rotatably mounted in said holding disks and carrying one of the clamps of the tail clamp, a spring-controlled bolt carrying the other clamping jaw, a cam-controlled lever for operating said second mentioned clamping-jaw, and a fixed stop bringing said bow-shaped support of the tail clamp back to the initial position.

In testimony whereof I hereunto affix my signature.

RUDOLPH BAADER.